United States Patent
Hanai

(10) Patent No.: US 8,537,826 B2
(45) Date of Patent: Sep. 17, 2013

(54) COMMUNICATION APPARATUS, COMMUNICATION APPARATUS CONTROLLING METHOD, AND NETWORK SYSTEM

(75) Inventor: Shinichi Hanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 210 days.

(21) Appl. No.: 13/103,546

(22) Filed: May 9, 2011

(65) Prior Publication Data

US 2011/0211580 A1   Sep. 1, 2011

Related U.S. Application Data

(63) Continuation of application No. PCT/JP2008/070845, filed on Nov. 17, 2008.

(51) Int. Cl.
*H04L 12/28* (2006.01)
*H04L 12/56* (2011.01)

(52) U.S. Cl.
USPC ...... 370/392; 370/397; 370/399; 370/395.31; 370/409

(58) Field of Classification Search
USPC ............ 370/389, 392, 397, 399, 395.31, 370/409
See application file for complete search history.

(56) References Cited

U.S. PATENT DOCUMENTS 7,200,649 B1 * 4/2007 Batke et al. ............. 709/222

FOREIGN PATENT DOCUMENTS

| JP | 6-75900 | 3/1994 |
|---|---|---|
| JP | 08-186569 | 7/1996 |
| JP | 8-186569 | 7/1996 |
| JP | 11-196106 | 7/1999 |
| JP | 2001-308909 | 11/2001 |

OTHER PUBLICATIONS

S. Cheshire, "IPv4 Address Conflict Detection", IETF Trust Network Working Group, Jul. 2009, pp. 1-21.
S. Cheshire, "IPv4 Address Conflict Detection", IETF Trust Network Working Group, Jul. 2008, pp. 1-21.
International Search Report for PCT/JP2008/070845, mailed Jan. 13, 2009.
Japanese Decision of Rejection mailed Feb. 5, 2013, issued in corresponding Japanese Patent Application No. 2010-537649.

* cited by examiner

*Primary Examiner* — Ronald Abelson
(74) *Attorney, Agent, or Firm* — Staas & Halsey LLP

(57) ABSTRACT

A terminal connected to a network stores association information between a physical address and a logical address of the terminal as first association information in an address association information storing unit. The terminal obtains association information between a physical address and a logical address, which is transmitted to the terminal via the network, as second association information. The terminal determines, based on the first association information stored in the storing unit and the second association information, whether or not the logical address included in the first association information is duplicate. If the logical address is determined to be duplicate, the first association information is notified to a device belonging to the network to which the terminal belongs, and the device is instructed to resolve duplication of the logical address.

6 Claims, 13 Drawing Sheets

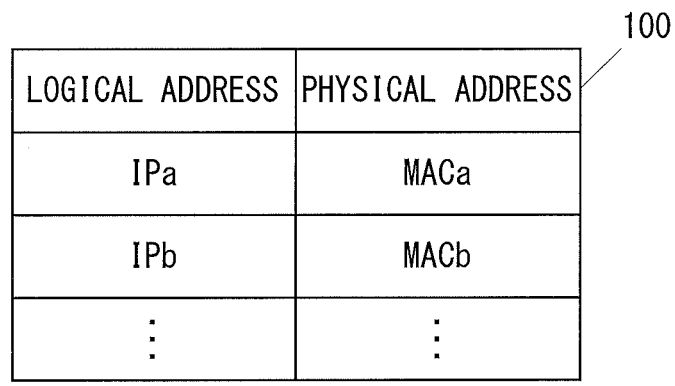
F I G. 2

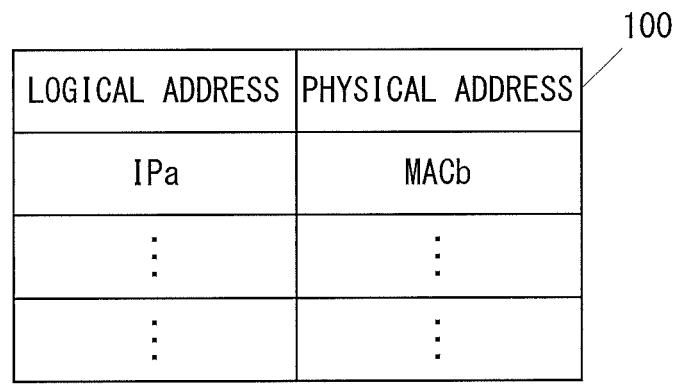
F I G. 3 A
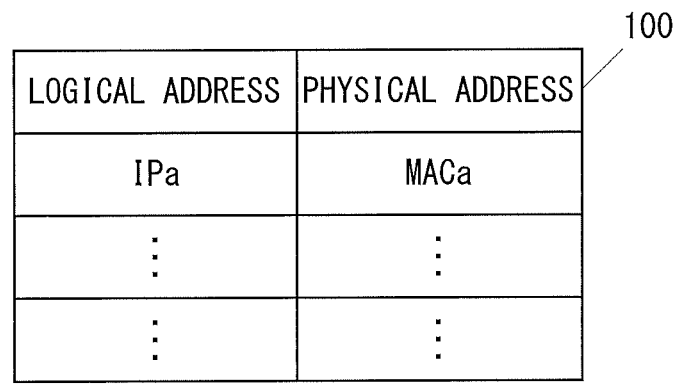
F I G. 3 B

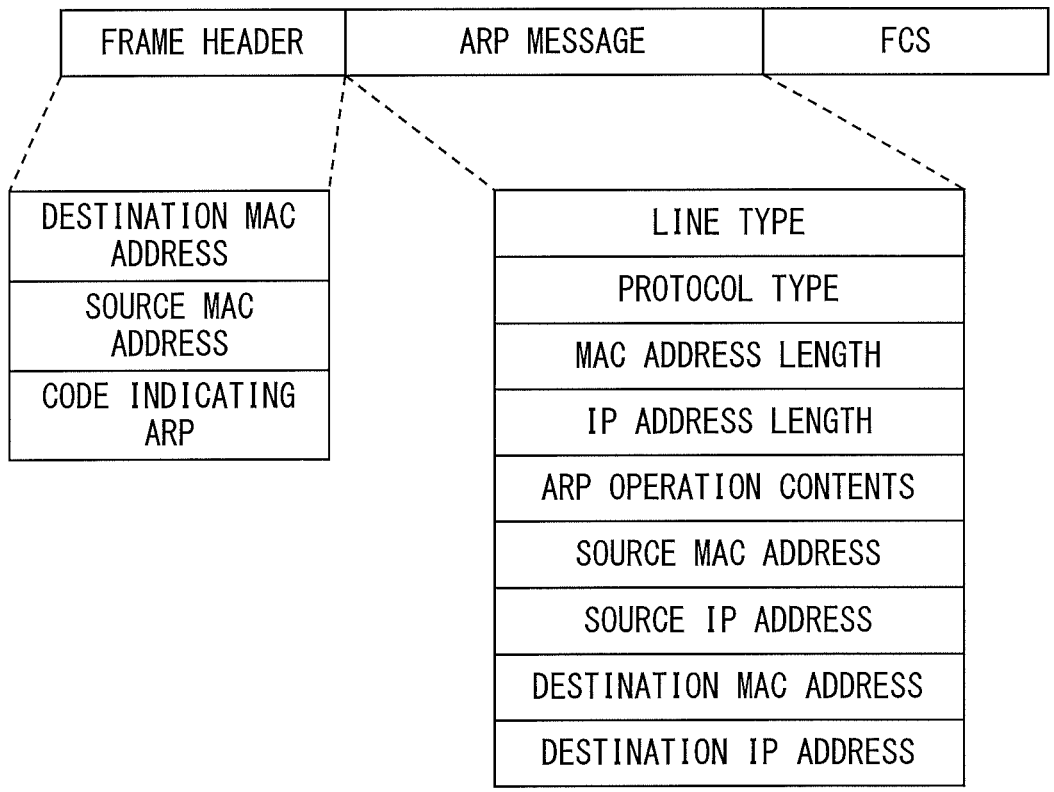
F I G. 4

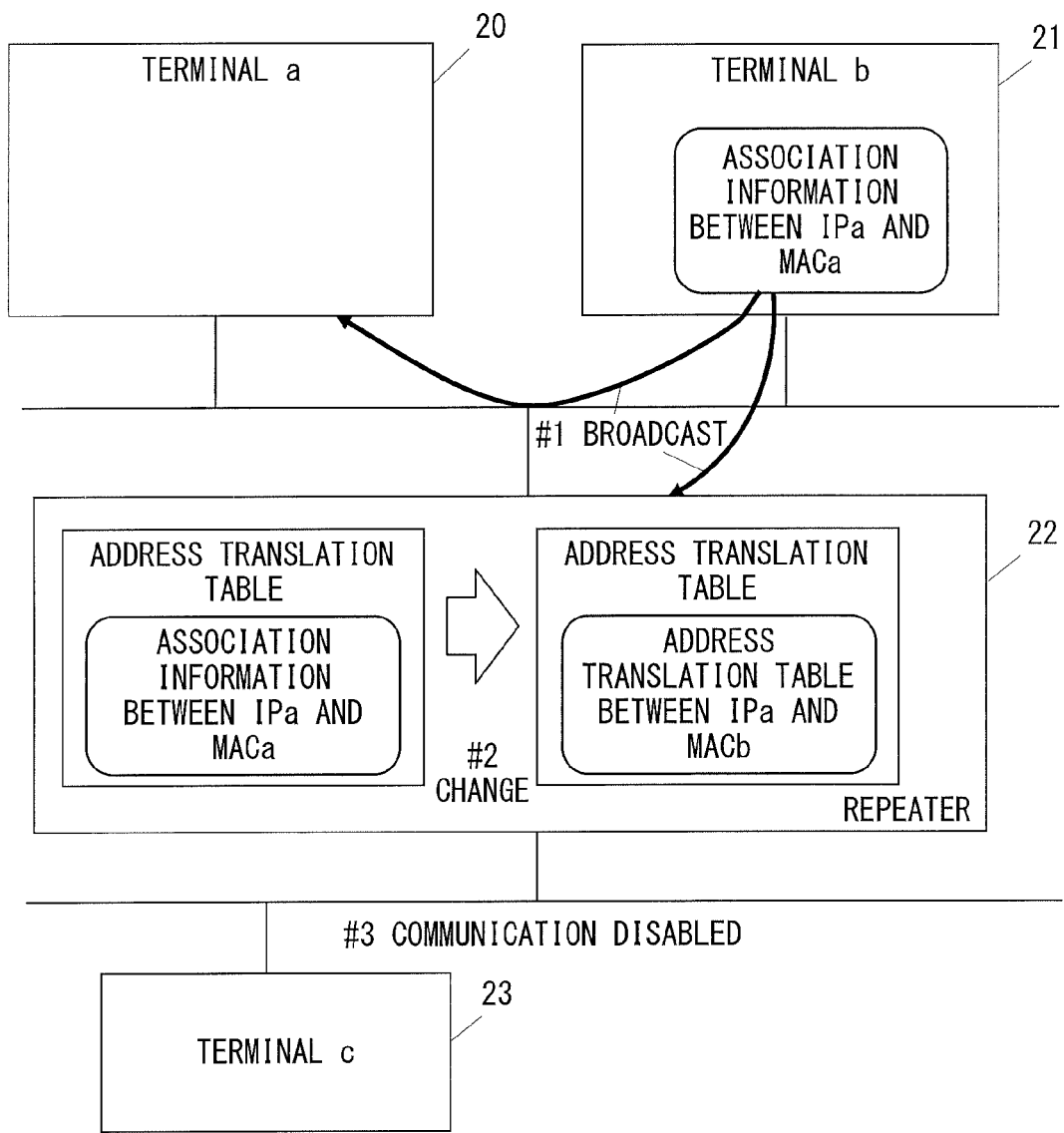
F I G. 1 1

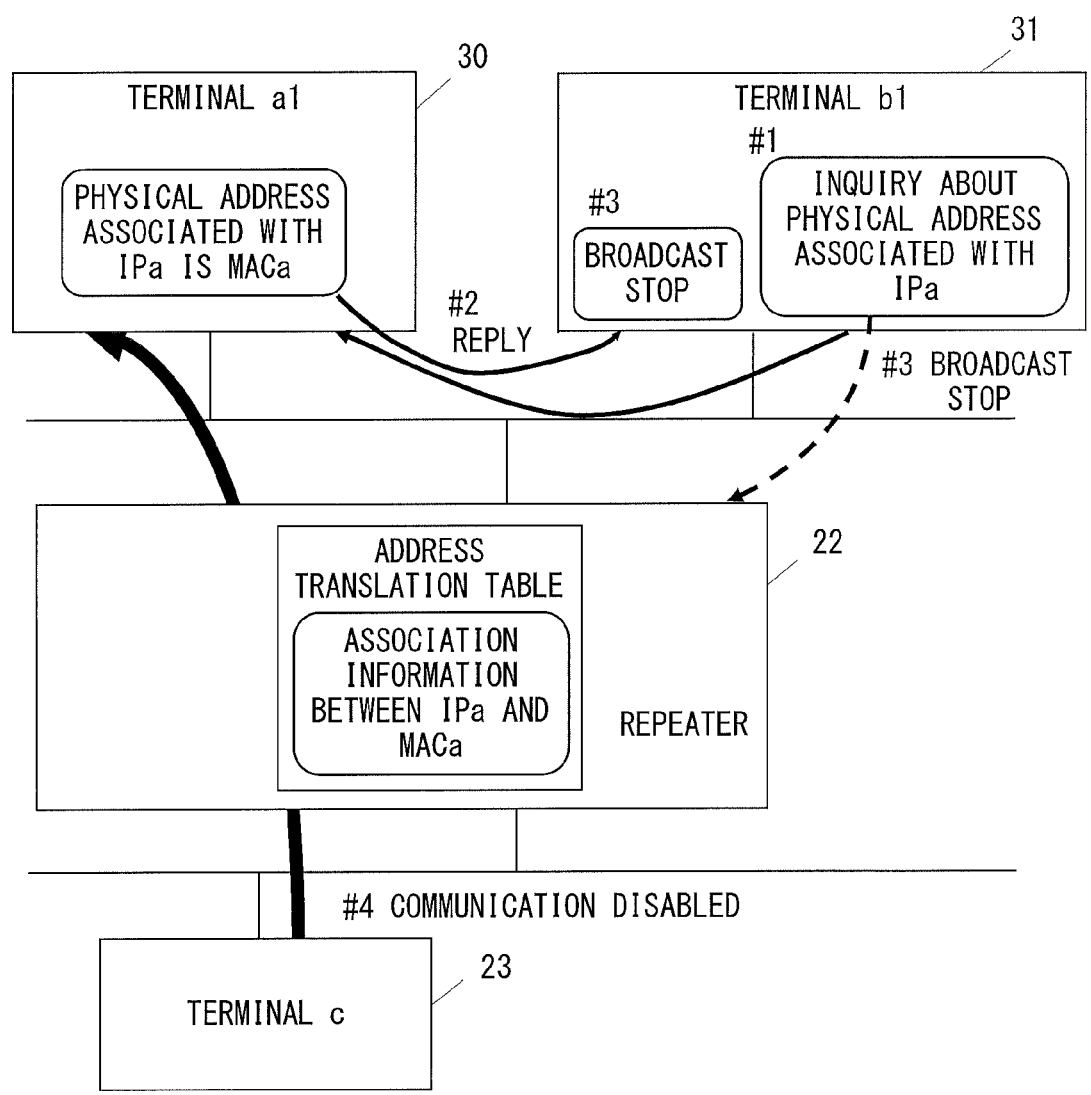
F I G. 1 2

COMMUNICATION APPARATUS, COMMUNICATION APPARATUS CONTROLLING METHOD, AND NETWORK SYSTEM

CROSS-REFERENCE TO RELATED APPLICATION

This application is a continuation application of International PCT Application No. PCT/JP2008/070845 which was filed on Nov. 17, 2008.

FIELD

An embodiment of the present invention relates to a communication apparatus, a communication apparatus controlling method and a network system

BACKGROUND

In a common network, individual devices perform a communication by using a physical address written in a ROM (Read Only Memory) or the like in advance for each device or an interface board embedded in each device, and a logical address set for each protocol used in an actual communication. Physical addresses are uniformly managed by a manufacturer and provided along with hardware. Logical addresses are set by users for a communication protocol running on a device, and are used to identify a communication partner. For example, in TCP/IP (Transmission Control Protocol/Internet Protocol) communication protocol, a MAC (Media Access Control) address is a physical address, and an IP (Internet Protocol) address is a logical address.

Devices (terminals and repeaters) in a network hold a translation table between a MAC address and an IP address in their cache, and identify a destination of communication by updating information of the cache, for example, with ARP (Address Resolution Protocol). Here, the terminals indicate communication devices such as a server, a PC and the like provided with communication means such as a network interface for which a MAC address and an IP address are set. Moreover, the repeaters are repeaters such as a gateway for connecting two or more networks such as a LAN (Local Area Network) or the like.

Here, if IP address duplication occurs in a network, all terminals having a duplicate IP address are disabled to perform a communication. Therefore, a service is forced to be stopped. The IP address duplication means that the same IP address is assigned to a plurality of different physical addresses.

FIG. 11 is an explanatory view of the IP address duplication in a network system. 20, 21, 22 and 23 illustrated in FIG. 11 are respectively a terminal a, a terminal b, a repeater and a terminal c, which belong to the same network. Each of the terminals has a function of notifying (broadcasting) the other devices (the repeater 22 and the other terminals different from the local terminal) within the network to which the local terminal belongs of association information between an IP address and a MAC address, which is set in the local terminal. The repeater 22 has a function of translating, into a MAC address, an IP address of a destination of a packet, which is included in the packet transmitted from any of the terminals, by using an address translation table, and of transferring the packet to the terminal associated with the MAC address. In the address translation table, association information between an IP address and a MAC address is stored. For example, association information between an IP address IPa and a MAC address MACa of the terminal a illustrated in FIG. 11 is stored in the address translation table. The repeater 22 also has a function of changing association information stored in the address translation table based on association information between an IP address and a MAC address, which is broadcast from each of the terminals.

In the network system illustrated in FIG. 11, if a user erroneously sets the IP address IPa in association with a MAC address MACb of the terminal b, IPa is associated with MACb in the terminal b. In the meantime, IPa is correctly associated with MACa in the address translation table within the above described repeater 22. Therefore, the same IP address IPa is duplicate for the different MAC addresses. Here, the terminal b broadcasts the association information between IPa and MACb to the repeater 22 and the terminal a (see #1 of FIG. 11). The association information between IPa and MACb is information indicating that IPa is associated with MACb. The repeater 22 to which the association information has been broadcast changes the association information between IPa and MACa in the address translation table to the association information between IPa and MACb (see #2 of FIG. 11). As a result, for example, if the terminal c attempts to communicate with the terminal a via the repeater, the terminal c is disabled to communicate with the terminal a since the IP address IPa of the terminal a is associated with MACb in the address translation table within the repeater 22 (see #3 of FIG. 11).

To solve the problem that has been described with reference to FIG. 11 and is caused by the IP address duplication, for example, techniques described below with reference to FIGS. 12 and 13 are proposed.

FIG. 12 illustrates a first conventional technique. Devices denoted with the same reference numerals as those of the devices illustrated in FIG. 11 among devices of FIG. 12 indicate devices similar to those illustrated in FIGS. 11. 30 and 31 illustrated in FIG. 12 respectively indicate terminals a1 and b1. Assume that the IP address and the MAC address of the terminal 1a are IPa and MACa, and the MAC address of the terminal b1 is MACb. Also assume that an association is made between IPa and MACa in the address translation table included in the repeater 22.

With the first conventional technique, if a user sets the IP address IPa for the terminal b1 in association with the MAC address MACb of the terminal b1, the terminal b1 inquires of the other terminal (such as the terminal a1) in the network about a physical address associated with IPa attempted to be set for the local terminal b1 (see #1 of FIG. 12).

Then, the terminal a1 makes, to the terminal b1 in response to the inquiry, a reply such that the physical address associated with IPa is the physical address MACa of the local terminal (see #2 of FIG. 12). The terminal b1 that has received the above reply from the terminal a1 recognizes that IPa is duplicate for the terminal b1 and the terminal a1, and stops broadcasting, to all the devices (such as the repeater 22) belonging to the network (such as a sub-network) to which the terminal b1 belongs, the association information between IPa and MACb (see #3 of FIG. 12). Accordingly, the address translation table within the repeater 22 is not changed, and the terminal c is enabled to communicate with the terminal a1 to be communicated in consequence (see #4 of FIG. 12).

FIG. 13 illustrates a second conventional technique. Devices denoted with the same reference numerals as those of the devices illustrated in FIG. 12 among devices of FIG. 13 indicate devices similar to those illustrated in FIG. 12. 32 illustrated in FIG. 13 indicates a terminal b2. Assume that a MAC address of the terminal b2 is MACb. Also assume that an association is made between IPa and MACa in the address translation table included in the repeater 22.

If a user sets the IP address IPa in association with the MAC address MACb of the terminal b2, IPa is associated with MACb. However, IPa is associated with MACa in the address translation table within the repeater 22. Therefore, IPa is duplicate for the different MAC addresses. With the second conventional technique, the terminal b2 broadcasts the association information between IPa and MACb to the other devices (such as the terminal a1 and the repeater 22) in the network (see #1 of FIG. 13). Then, the repeater 22 changes the association information between IPa and MACa in the address translation table to the association information between IPa and MACb according to the information broadcast from the terminal b2 (see #2 of FIG. 13). Then, the terminal a1 makes, to the terminal b2, a reply such that the physical address associated with IPa is the physical address MACa of the local terminal in response to the broadcast information from the terminal b2 (see #3 of FIG. 13). The terminal b2 that has received the reply from the terminal a1 recognizes that IPa is duplicate for the terminal b2 and the terminal a1, and broadcasts the association information between IPa and MACa indicating whether IPa is associated with MACa to all the devices such as the repeater 22 belonging to a network such as a sub-network to which the terminal b2 belongs (see #4 of FIG. 13). The repeater 22 to which the association information between IPa and MACa has been broadcast from the terminal b2 again changes the address translation table changed in the above #2 (see #5 of FIG. 13), and again associates IPa with MACa. As a result, the terminal c is enabled to communicate with the terminal a1 to be communicated (see #6 of FIG. 13).

An address management method for monitoring communication data that flows in a network and for automatically creating an association between a physical address and a network address of each terminal in an address association table is proposed.

Patent Document 1: Japanese Laid-open Patent Publication No. H11-196106

The first conventional technique described with reference to FIG. 12 assumes that a terminal b1 (hereinafter referred to as a first address duplication resolving terminal) for inquiring of a different device in a network about a physical address associated with an IP address attempted to be set for the local terminal, and for stopping broadcasting association information between the IP address and the physical address of the local terminal to all devices such as the repeater 22 belonging to the network such as a sub-network, to which the local terminal belongs, according to an inquiry result exists in the network. Moreover, the second conventional technique described with reference to FIG. 13 assumes that a terminal b2 (hereinafter referred to as a second address duplication resolving terminal) for broadcasting association information between an IP address set for the local terminal and a physical address of the local terminal to a different device in a network, and for broadcasting correct association information between the IP address and the physical address to all devices (such as the repeater 22) belonging to the network (such as a sub-network), to which the local terminal belongs, according to a result of a reply to the broadcast information from a different terminal (terminal a1 of FIG. 13) for which the IP address is set exists in the network.

However, if logical address duplication that is not intended by a user occurs due to a fault, a trouble or an erroneous setting of a device (such as a repeater) belonging to a network when neither the first nor the second address duplication resolving terminal exists in the network, a terminal that is performing a communication with this logical address is disabled to communicate with a terminal to be communicated.

SUMMARY

The communication apparatus of an embodiment of the invention is a communication apparatus connected to a network. The communication apparatus includes: a storing unit configured to store association information between a physical address and a logical address of the communication apparatus as first association information; an obtaining unit configured to obtain, as second association information, association information between a physical address and a logical address, which is transmitted to the communication apparatus via the network; a determining unit configured to determine, based on the first association information and the second association information, whether or not the logical address included in the first association information is duplicate; and a notifying unit configured to notify a device belonging to the network, to which the local communication apparatus belongs, of the first association information if the logical address is determined to be duplicate, and to instruct the device to resolve duplication of the logical address.

The controlling method for the communication apparatus is a controlling method for a communication apparatus connected to a network. The controlling method includes: a step of causing the communication apparatus connected to the network to store, in a storing unit, association information between a physical address and a logical address of the communication apparatus as first association information; and a step of causing the communication apparatus to obtain, as second association information, association information between a physical address and a logical address, which is transmitted to the communication apparatus via the network, of causing the communication apparatus to determine, based on the first association information stored in the storing unit and the second association information, whether or not the logical address included in the first association information is duplicate, and of causing the communication apparatus to notify a device belonging to the network, to which the local communication apparatus belongs, of the first association information if the logical address is determined to be duplicate, and to instruct the device to resolve duplication of the logical address.

The network system is a network system including a network and a communication apparatus connected to the network. In the network system, the communication apparatus includes a storing unit configured to store association information between a physical address and a logical address of the communication apparatus as first association information, an obtaining unit configured to obtain, as second association information, association information between a physical address and a logical address, which is transmitted to the communication apparatus via the network, a determining unit configured to determine, based on the first association information and the second association information, whether or not the logical address included in the first association information is duplicate, and a notifying unit configured to notify a device belonging to the network, to which the local communication apparatus belongs, of the first association information if the logical address is determined to be duplicate, and to instruct the device to resolve duplication of the logical address.

With the communication apparatus, the controlling method for the communication apparatus and the network system, the communication apparatus determines whether or not a logical address is duplicate based on first association information between a physical address and a logical address of the communication apparatus and second association information between a physical address and a logical address which is transmitted to the communication apparatus via a network, notifies a device belonging to the network to which the local communication apparatus belongs of the first association information if the logical address is determined to be duplicate, and instructs the device to resolve duplication of the logical address. Accordingly, with the communication apparatus, the controlling method for the communication apparatus and the network system, unintentional logical address duplication caused by a fault, a trouble or an erroneous setting of a device belonging to a network can be resolved.

The object and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWINGS

FIG. 2 illustrates an example of an address translation table;

FIGS. 3A and 3B illustrate examples of an address translation table;

FIG. 4 illustrates an example of a format of a reply packet and a recovery packet;

FIG. 11 is an explanatory view of IP address duplication in a network system;

FIG. 12 illustrates a first conventional technique; and

DESCRIPTION OF EMBODIMENT

Figure 1:
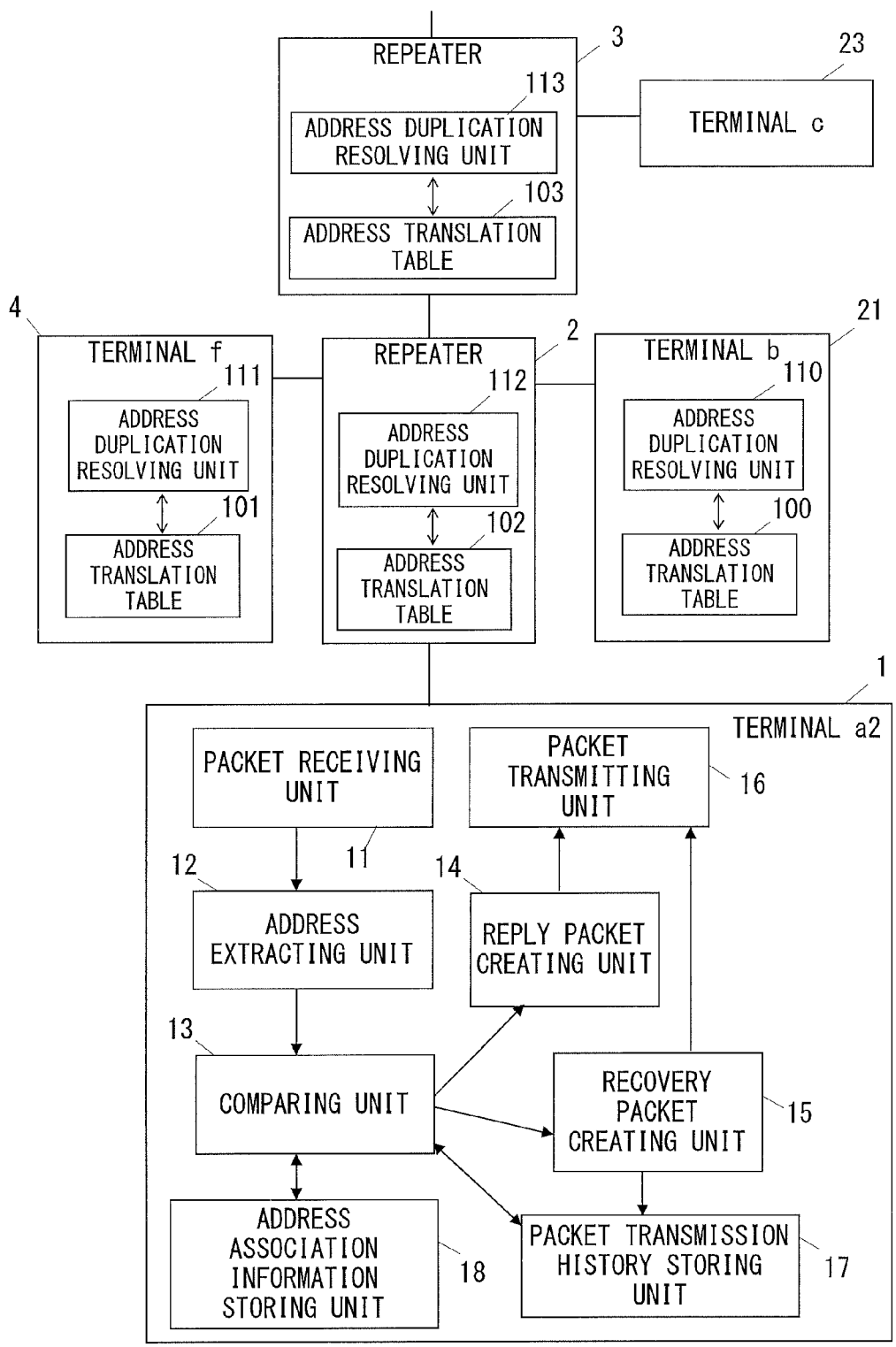
FIG. 1 illustrates a configuration example of a network system according to an embodiment.

FIG. 1 illustrates a configuration example of a network system according to an embodiment. The network system according to this embodiment is a network system including at least a terminal a2 (hereinafter referred to as a terminal 1) that is a communication apparatus according to the embodiment and connected to a network. In the example illustrated in FIG. 1, the network system includes repeaters 2, 3 and a plurality of terminals (terminals 1, b, c, f). Reference numerals 4, 21 and 23 in FIG. 1 indicate the terminals f, b and c, respectively. Moreover, this embodiment assumes that devices include the terminals and the repeaters. The terminals are connected to the repeater 2 or 3 wiredly or wirelessly, and transmit/receive communication data such as a packet, a frame and the like to/from other terminals different from a local terminal via the repeater 2 or 3. Namely, the repeaters 2 and 3 are a gateway for relaying a packet transmitted/received among the terminals, a hub or a repeater such as an L3 (Layer 3) switch or the like. In the example illustrated in FIG. 1, the repeater 2 is for example a hub, and the repeater 3 is for example an L3 switch. The repeater 3 can transmit a packet transmitted from any of the devices such as the terminal 1, b, f or the repeater 2 in a sub-network that is a network subordinate to the repeater 3 to a network such as the terminal c external to the sub-network.

Moreover, the repeater 3 can transmit a packet transmitted from a network external to the sub-network to any of the devices in the sub-network.

The terminal 1 resolves logical address duplication in the sub-network to which the terminal 1 belongs. Physical addresses of the terminal 1, the terminal b, the terminal c, the terminal f, the repeater 2 and the repeater 3, and IP addresses associated with the physical addresses are MACa and IPa, MACb and IPb, MACc and IPc, MACf and IPf, MACe and IPe, and MACd and IPd. In the network system in this embodiment, the terminal b, the terminal f, the repeater 2 and the repeater 3 respectively include address translation tables 100, 101, 102, and 103, which are storing units for storing association information between an IP address and a MAC address of each of the devices in the sub-network to which the local device belongs. FIG. 2 illustrates an example of the address translation table 100 included in the terminal b. The address translation tables respectively included in the terminal f, the repeater 2 and the repeater 3 have a configuration similar to the address translation table 100 illustrated in FIG. 2.

Additionally, the terminal b, the terminal f, the repeater 2 and the repeater 3 respectively include address duplication resolving units 110, 111, 112, 113 for receiving a reply packet or a recovery packet, which is transmitted from the terminal 1 and will be described later, and for resolving logical address duplication based on first association information such as association information between MACa and IPa included in the reply packet or the recovery packet. The address duplication resolving units included in the terminal b, the terminal f, the repeater 2 and the repeater 3 resolve logical address duplication by updating association information within the address translation table of the local terminal or repeater with the first association information.

Logical address duplication resolved by the terminal b is described below as an example. Assume that the first association information included in a reply packet or a recovery packet is association information between MACa and IPa. Also assume that IPa is currently associated with MACb in the address translation table 100 included in the terminal b due to a fault, a trouble or an erroneous setting of a device belonging to the network as illustrated in FIG. 3A. In this case, the address duplication resolving unit 110 of the terminal b receives a reply packet or a recovery packet from the terminal 1, extracts the association information between MACa and IPa from the reply packet or the recovery packet, and recognizes that the physical address associated with IPa is MACa. Moreover, the address duplication resolving unit 110 recognizes that the above described IPa is associated with MACb by referencing, for example, the address translation table 100 illustrated in FIG. 3A. As a result, the address resolution resolving unit 110 determines that IPa is associated with duplicate addresses MACa and MACb. Then, the address duplication resolving unit 110 rewrites the association information between IPa and MACb in the address translation table 100 illustrated in FIG. 3A to the association information between IPa and MACa, which is extracted from the reply packet or the recovery packet. Consequently, as illustrated in FIG. 3B, IPa is associated with MACb in the address translation table 100, and the logical address (IPa) duplication is resolved. Note that the process for resolving the logical address duplication, which is executed by the terminal f, the repeater 2 or the repeater 3, is similar to that executed by the above described terminal b.

The terminal 1 includes a packet receiving unit 11, an address extracting unit 12, a comparing unit 13, a reply packet creating unit 14, a recovery packet creating unit 15, a packet transmitting unit 16, a packet transmission history storing unit 17, and an address association information storing unit 18.

The address association information storing unit 18 stores address association information of the devices (the terminal b, the terminal f, the repeater 2 and the repeater 3 here) in the sub-network to which the terminal 1 belongs. The address association information is information including association information between a logical address and a physical address of each of the devices. The address association information includes at least the association information (hereinafter referred to as first association information) between the physical address (MACa) and the logical address (IPa) of the terminal 1. Namely, the address association information storing unit 18 is a storing unit for storing the association information between the physical address and the logical address of the terminal 1 as the first association information.

The packet receiving unit 11 receives, for example, a packet transmitted to the terminal 1 via the repeater 3 or 2. The address extracting unit 12 extracts the MAC address of the source of this packet, and the IP address of the source, which is associated with the MAC address, from the packet received by the packet receiving unit 11, and obtains association information between the extracted MAC address and IP address as second association information. For example, the address extracting unit 12 obtains the association information between MACb and the IP address IPa associated with MACb from the packet as the second association information. Namely, the packet receiving unit 11 and the address extracting unit 12 are obtaining means for obtaining the association information between the physical address and the logical address, which is transmitted to the terminal 1 via the network, as the second association information.

The comparing unit 13 makes a comparison between the first association information within the address association information storing unit 18 and the second association information obtained by the address extracting unit 12, and determines whether or not the logical address of the local terminal, which is included in the first association information, is duplicate, namely, whether or not the logical address of the local terminal is associated with the physical address of the local terminal and the physical address of a different terminal. Specifically, the comparing unit 13 determines whether or not the logical address (such as IPa) included in the first association information is associated with a plurality of different physical addresses (such as MACa and MACb) including the physical address of the local terminal. If determining that the logical address (IPa) included in the first association information is associated with the plurality of different physical addresses (MACa and MACb) including the physical address of the local terminal, the comparing unit 13 determines that the logical address included in the first association information is duplicate. Namely, the comparing unit 13 has a function as a determining unit for determining, based on the first association information and the second association information, whether or not the logical address included in the first association information is duplicate.

Additionally, if determining that the logical address included in the first association information is duplicate with the logical address included in the second association information based on a comparison result, the comparing unit 13 causes a reply packet creating unit 14 to be described later to create a reply packet. The reply packet is a packet including the first association information (such as the association information between MACa and IPa). This is a packet for notifying a different terminal (such as the terminal b associated with MACb) having a physical address extracted by the address extracting unit 12 of the first association information, and for instructing the different terminal to resolve the logical address duplication.

Additionally, if determining that the logical address included in the first association information is duplicate, the comparing unit 13 causes a recovery packet creating unit 15 to be described later to create a recovery packet. The recovery packet is a packet including the first association information (such as the association information between MACa and IPa), and this is a packet for instructing all devices belonging to the network (such as a sub-network) to which the local terminal (terminal 1) belongs to resolve the logical address duplication by notifying the first association information.

The above described reply packet and recovery packet have, for example, a format of an ARP packet illustrated in FIG. 4. The ARP packet (reply packet or recovery packet) illustrated in FIG. 4 has a frame header, an ARP message and FCS (Frame Check Sequence). In the frame header, a MAC address of a destination, a MAC address of a source, and a code indicating ARP are set. In the ARP message, a type of a line, a type of a protocol, a MAC address length, an IP address length, contents of an ARP operation, the MAC address of the source, an IP address of the source, the MAC address of the destination, and an IP address of the destination are set. FCS is a data string used to examine whether or not a bit is corrupted in a packet.

For the reply packet, a MAC address (such as MACb) of a different terminal having a physical address extracted by the address extracting unit 12 is set as the MAC address of the destination in the frame header, and the MAC address (MACa) of the local terminal (terminal 1) is set as the MAC address of the source. Moreover, "reply" indicating that a reply to an inquiry about whether or not the IP address of the terminal 1 is associated with the MAC address of the destination (whether or not the IP address is duplicate) is requested of the destination of the packet is set as the contents of the ARP operation in the ARP message. Moreover, the MAC address (MACa) and the IP address (IPa) of the terminal 1 are set respectively as the MAC address and the IP address of the source in the ARP message. This association information between the MAC address and the IP address of the source in the ARP message is the above described first association information. Additionally, the MAC address of the different terminal having the physical address extracted by the address extracting unit 12, and the IP address of the different terminal are respectively set as the MAC address and the IP address of the destination in the ARP message.

For the reply packet, MAC addresses of all the devices belonging to the network to which the terminal 1 belongs are set as the MAC address of the destination in the frame header, and the MAC address (MACa) of the local terminal (terminal 1) is set as the MAC address of the source. Moreover, "request" indicating that a reply is requested of the destination of the packet is set as the contents of the ARP operation in the ARP message. The MAC address (MACa) and the IP address (IPa) of the terminal 1 are respectively set as the MAC address and the IP address of the source in the ARP message. The association information between the MAC address and the IP address of the source in the ARP message is the above described first association information. Moreover, no information is set as the MAC address of the destination in the ARP message. Additionally, the IP address of the terminal 1 is set as the IP address of the destination in the ARP message. In the above described recovery packet, "request" is set as the contents of the ARP operation in the ARP message, and the IP address of the terminal 1 that is the local terminal is set as the IP address of the destination in the ARP message. Namely, the recovery packet does not assume that a reply is returned from the destination of the packet.

Referring back to FIG. 1. The comparing unit 13 determines whether or not the number of transmissions of the recovery packet per unit time (such as 1 ms), which is stored in a packet transmission history storing unit 17 to be described later, exceeds a predetermined threshold value. The unit time can be set to a suitable duration predetermined according to the performance of a CPU (Central Processing Unit), not illustrated and included in the terminal 1, the type of a network, the type of a communication rate or the like. The comparing unit 13 instructs the recovery packet creating unit 15 to stop creating a recovery packet if determining that the number of transmissions exceeds the predetermined threshold value. As a result, the notification of the first association information to all the devices belonging to the network to which the terminal 1 belongs is stopped.

The reply packet creating unit 14 creates a reply packet. The packet transmitting unit 16 transmits the reply packet created by the reply packet creating unit 14 to a different terminal having the same physical address, extracted by the address extracting unit 12, as that of the local terminal. The recovery packet creating unit 15 creates a recovery packet, and broadcasts association information by instructing the packet transmitting unit 16 to transmit the recovery packet to all the devices belonging to the network (such as the sub-network) to which the terminal 1 belongs. The packet transmitting unit 16 transmits the reply packet and the recover packet to a device of a destination. Namely, the reply packet creating unit 14, the recovery packet creating unit 15 and the packet transmitting unit 16 have a function as a notifying unit for instructing devices to resolve logical address duplication by notifying the first association information to the devices (such as the terminals b, f and the repeaters 2, 3 in FIG. 1) belonging to the network to which the local terminal belongs if the logical address of the local terminal is determined to be duplicate with that of a different terminal. For example, the repeater 2 or 3 resolves the IP address duplication by updating association information between an IP address and a MAC address, which is stored in the address translation table in the local repeater, with the first association information included in the recovery packet.

Figure 13:
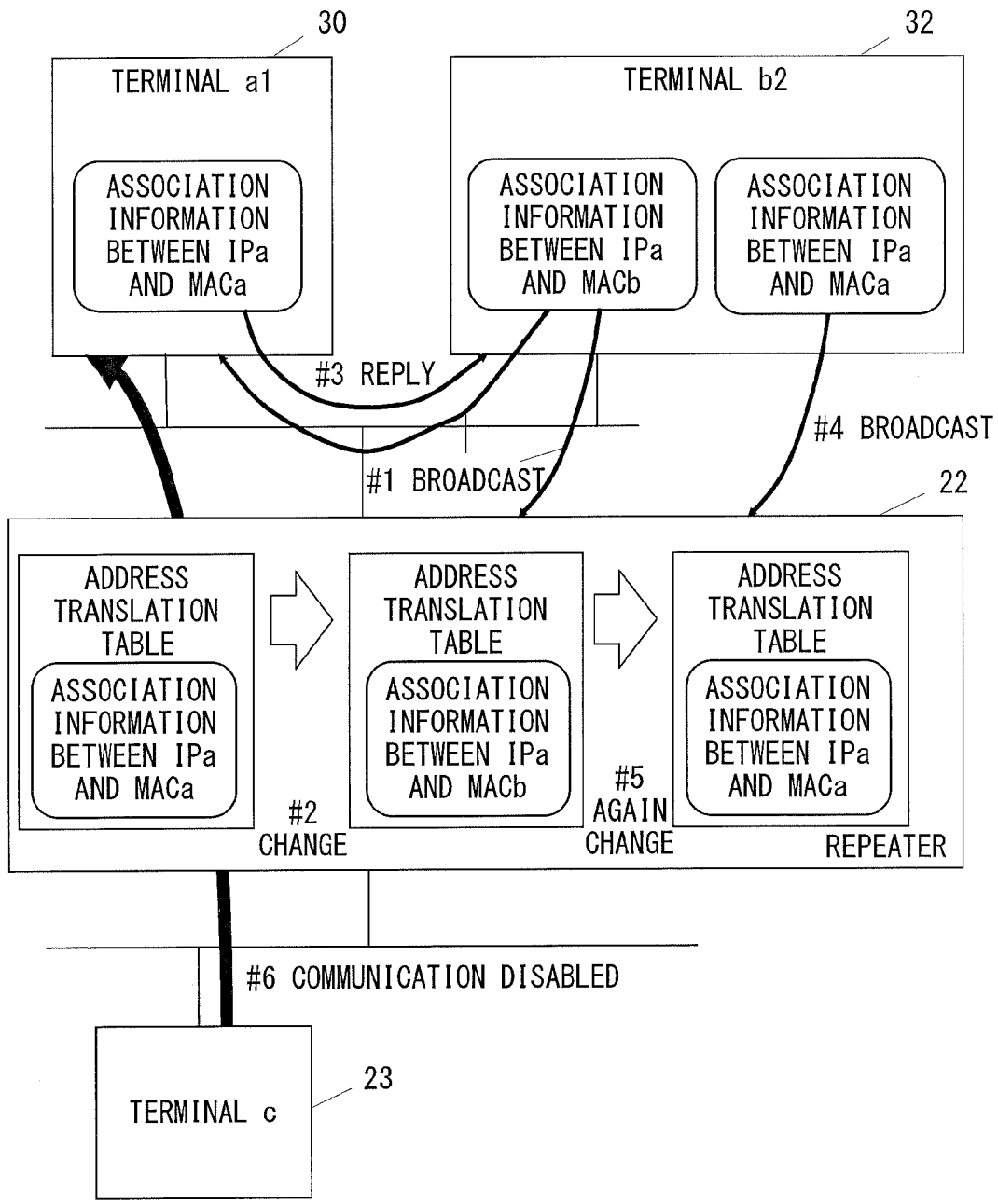
FIG. 13 illustrates a second conventional technique.

The packet transmission history storing unit 17 stores the number of transmissions of a recovery packet, for example, per unit time. Namely, the packet transmission history storing unit 17 has a function as a notification number storing unit for storing the number of notifications of the first association information to the devices. Note that the network system in this embodiment may include, for example, the terminal b2 described above with reference to FIG. 13 as a replacement for the terminal b. For example, if the terminal b2 transmits a packet including association information between the physical address of the terminal b2 and the IP address (IPa) of the terminal 1 to the terminal 1 illustrated in FIG. 1, the comparing unit 13 determines that IPa is duplicate for the physical address of the terminal b2 and that of the terminal 1. Then, the reply packet creating unit 14 creates a reply packet including the first association information, and instructs the packet transmitting unit 16 to transmit the reply packet to the terminal b2. The terminal b2 that has received this reply packet notifies the devices (such as the repeaters 2 and 3) belonging to the network to which the terminal b2 belongs of the first association information included in the reply packet, and instructs all the devices to resolve the logical address duplication.

Figure 5:
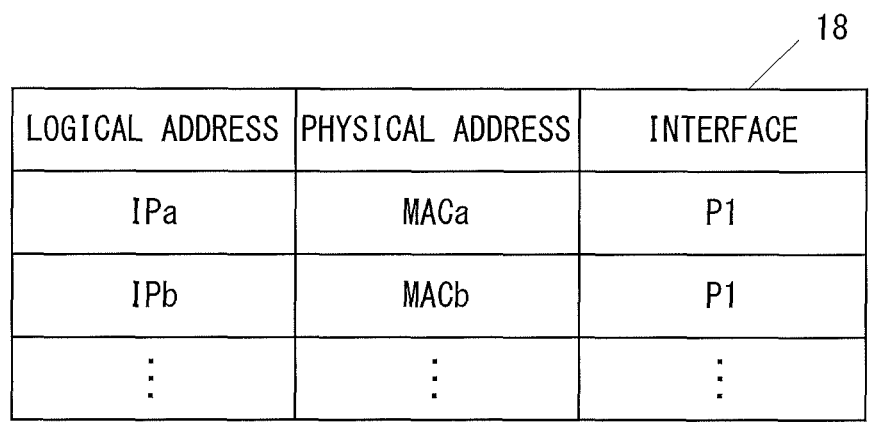
FIG. 5 illustrates an example of address association information.

FIG. 5 illustrates an example of address association information stored in the address association information storing unit. The address association information has a data structure composed of a physical address, a logical address and an interface, which are associated with the physical address. The physical address is a MAC address of a device in the sub-network to which the terminal 1 belongs. The logical address is an IP address associated with the MAC. The interface is identification information of a transmission port when a packet is transmitted to a device having the associated MAC address. Assume that the physical address and the IP address of the terminal 1 illustrated in FIG. 1 are MACa and IPa, respectively. In this case, information indicated in the first row is the first association information in the address association information illustrated in FIG. 6.

Figure 6:
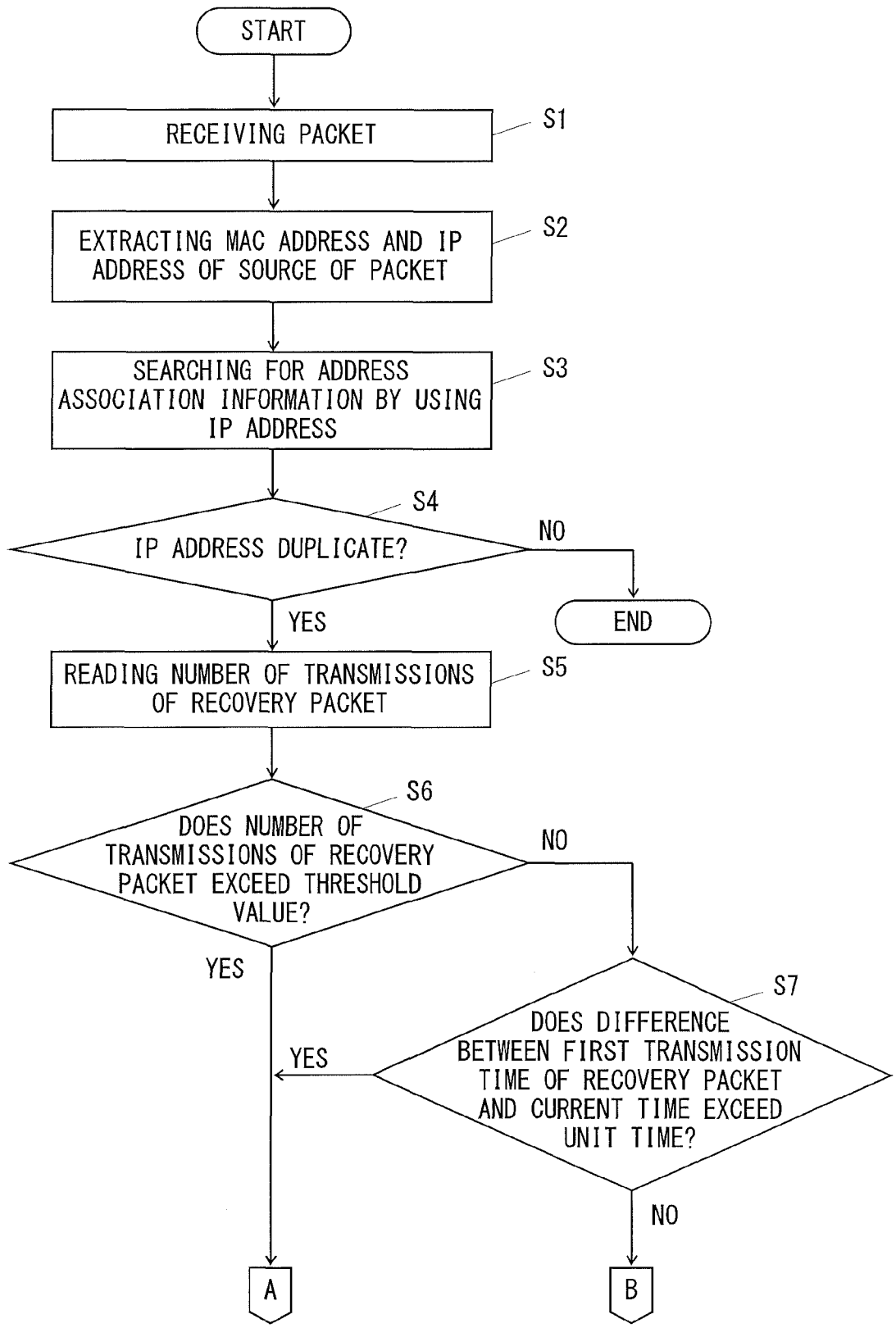
FIG. 6 illustrates one example of a logical address duplication resolution process flow according to the embodiment.
Figure 7:
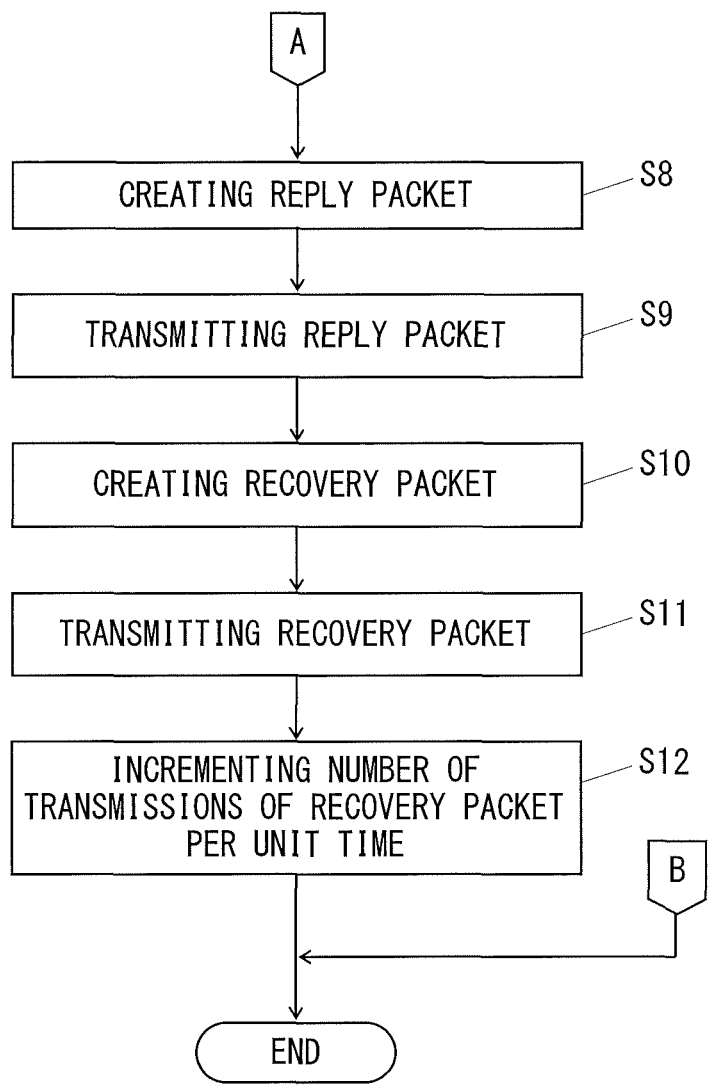
FIG. 7 illustrates one example of the logical address duplication resolution process flow according to the embodiment.

FIGS. 6 and 7 illustrate a control process flow of the communication apparatus according to the embodiment. Namely, these figures illustrate one example of a logical address duplication resolution process flow. When the packet receiving unit 11 of the terminal 1 receives a packet transmitted via the network in step S1 of FIG. 6, the address extracting unit 12 extracts the MAC address and the IP address of the source of the packet from the above packet (step S2). Next, the comparing unit 13 searches for address association information within the address association information storing unit 18 by using the extracted IP address (step S3), and determines whether or not the extracted IP address is duplicate, namely, whether or not the IP address is associated with the MAC address of the terminal 1 (step S4). If the comparing unit 13 determines that the IP address is not duplicate, the process is terminated. If determining that the IP address is duplicate, the comparing unit 13 reads the number of transmissions, stored in the packet transmission history storing unit 17, of a recovery packet transmitted from the local terminal via the network (step S5).

Next, the comparing unit 13 determines whether or not the number of transmissions of the recovery packet exceeds a predetermined threshold value (step S6). If determining that the number of transmissions of the recovery packet exceeds the predetermined threshold value, the comparing unit 13 determines whether or not a difference between the first transmission time of the recovery packet and the current time exceeds the unit time (such as 1 ms) (step S7). Note that the unit time can be set to a suitable duration predetermined according to the performance of a CPU included in the terminal 1, the type of a network, the type of a communication rate or the like.

If the comparing unit 13 determines that the difference between the first transmission time of the recovery packet and the current time does not exceed the unit time, the process is terminated (see FIG. 7). If the comparing unit 13 determines that the difference between the first transmission time of the recovery packet and the current time exceeds the unit time, the process proceeds to step S8.

If determining that the number of transmissions of the recovery packet does not exceed the predetermined threshold value, the comparing unit 13 instructs the reply packet creating unit 14 to create a reply packet that includes the IP address determined to be duplicate in the above described step S4 and the MAC address of the terminal 1, which is associated with the IP address. Then, the packet transmitting unit 16 transmits the reply packet to a device having the MAC address, extracted from the packet in the above described S2, of the source of the packet (step S9). Next, the comparing unit 13 instructs the recovery packet creating unit 15 to create a recovery packet that includes the IP address determined to be duplicate in the above described step S4 and the MAC address of the terminal 1, which is associated with the IP address (step S10). Then, the packet transmitting unit 16 transmits the recovery packet to all the devices in the network (such as the sub-network) to which the terminal 1 belongs (step S11). Devices that have received this recovery packet resolve the IP address duplication by updating the association information, included in the address translation table within the local device, between the IP address and the MAC address of each device based on the above IP address and MAC address, which are included in the recovery packet.

The IP address duplication resolution is described by taking, as an example, a case where the address duplication resolving unit 110 of the terminal b illustrated in FIG. 1 receives a recovery packet having the format illustrated in FIG. 4 from the packet transmitting unit 16 of the terminal 1. Assume that this recovery packet includes the association information between MACa and IPa. Namely, MACa and IPa are respectively set as the MAC address and the IP address of the source in the ARP message of the recovery packet.

Also assume that IPa is associated with MACb in the address translation table 100 included in the terminal b due to a fault, a trouble or an erroneous setting of a device belonging to the network as illustrated in the above described FIG. 3A. The address duplication resolving unit 110 of the terminal b extracts the association information between MACa and IPa from the received recovery packet. Moreover, the address duplication resolving unit 110 recognizes that IPa is associated with MACb by referencing the address translation table 100 illustrated in FIG. 3A. As a result, the address duplication resolving unit 110 determines that IPa is associated with duplicate addresses MACa and MACb. Then, the address duplication resolving unit 110 rewrites the association information between IPa and MACb in the address translation table 100 illustrated in FIG. 3A to the association information between IPa and MACa, which is extracted from the recovery packet. As a result, as illustrated in the above described FIG. 3B, IPa is associated with MACb in the address translation table 100, whereby the logical address (IPa) duplication is resolved.

Next, the packet transmission history unit 17 of the terminal 1 increments the stored number of transmissions of a recovery packet per unit (step S12). In step S12, the packet transmission history storing unit 17 sets the number of transmissions to 1 after registering a transmission time if the transmission of the recovery packet is the first one. Moreover, the packet transmission history storing unit 17 sets the number of transmissions to 1 after registering a transmission time also if the transmission time of the recovery packet exceeds the unit time (such as 1 ms).

Figure 8:
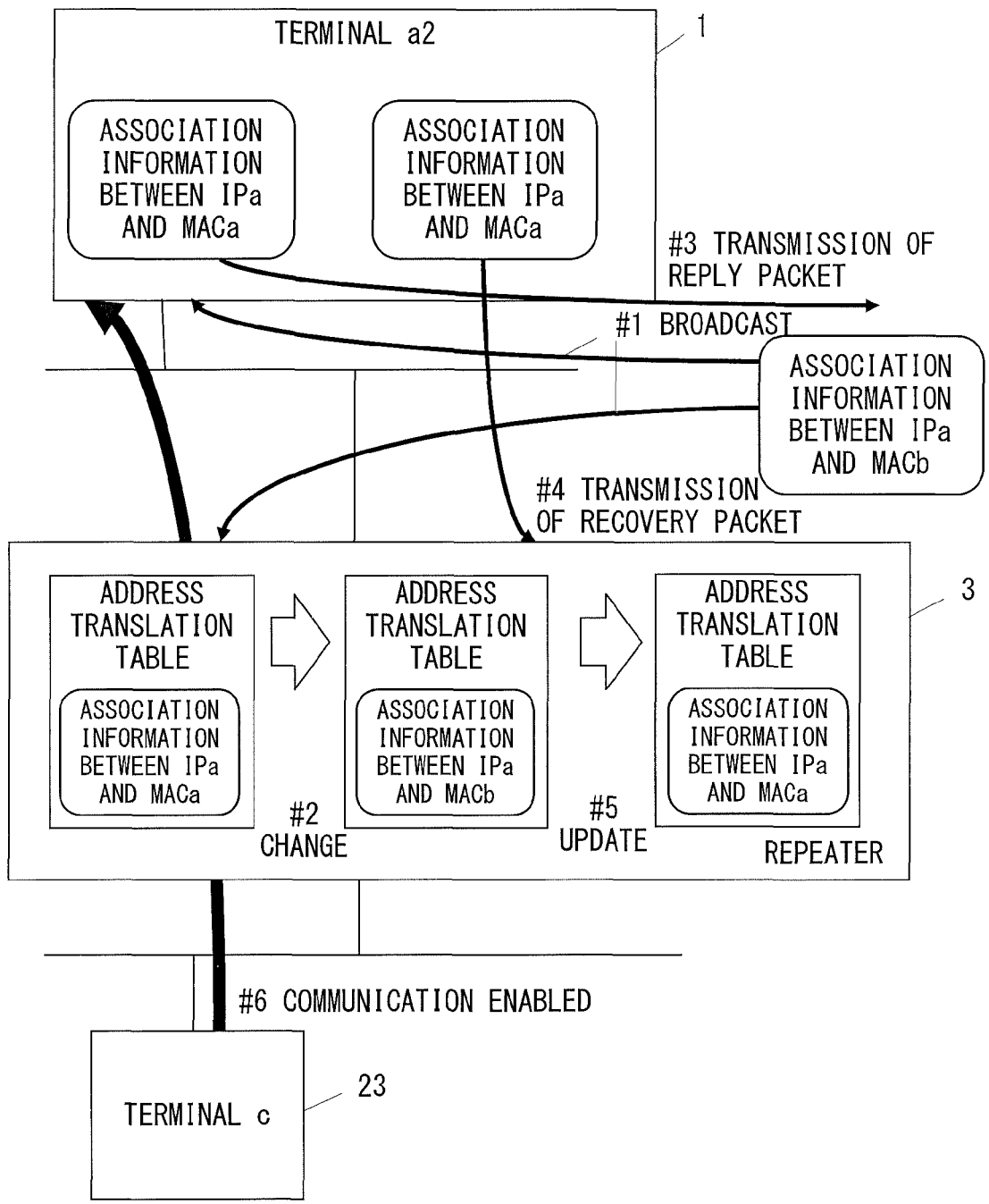
FIG. 8 is an explanatory view of a first application example of a communication apparatus according to the embodiment.

FIG. 8 is an explanatory view of a first application example of the communication apparatus according to this embodiment. The terminal 1 (terminal a2) in FIG. 8 is the communication apparatus according to this embodiment, and has the IP address IPa and the physical address MACa (the same applies to FIGS. 9 and 10 to be described later). Initially, association information between IPa and MACb is broadcast via the network due to a fault, a trouble or an erroneous setting of a device other than the terminal 1 (such as a repeater, not illustrated, other than the repeater 3) belonging to the network (see #1 of FIG. 8). The repeater 3 to which the association information has been broadcast changes the association information between IPa and MACa in the address translation table to the association information between IPa and MACb (see #2 of FIG. 8). In the meantime, the terminal 1 to which the association information has been broadcast determines that IPa is duplicate for the physical address MACa of the local terminal and the broadcast MACb, and transmits a reply packet to MACb (see #3 of FIG. 8). Moreover, the terminal 1 transmits a recovery packet including the association information between IPa and MACa to the repeater 3 (see #4 of FIG. 8). Then, the repeater 3 updates the association information between IPa and MACb in the address translation table with the association information between IPa and MACa, which is included in the recovery packet (see #5 of FIG. 8). As a result, the IPa duplication is resolved. Namely, with the first application example of the communication apparatus according to this embodiment described with reference to FIG. 8, the repeater 3 updates the address translation table based on the correct association information between the IP address (IPa) and the MAC address (MACa), which is transmitted from the terminal 1. As a result, for example, the terminal c is enabled to communicate with the terminal 1 by transmitting a packet to the IP address IPa via the repeater 3 (see #6 of FIG. 8).

Figure 9:
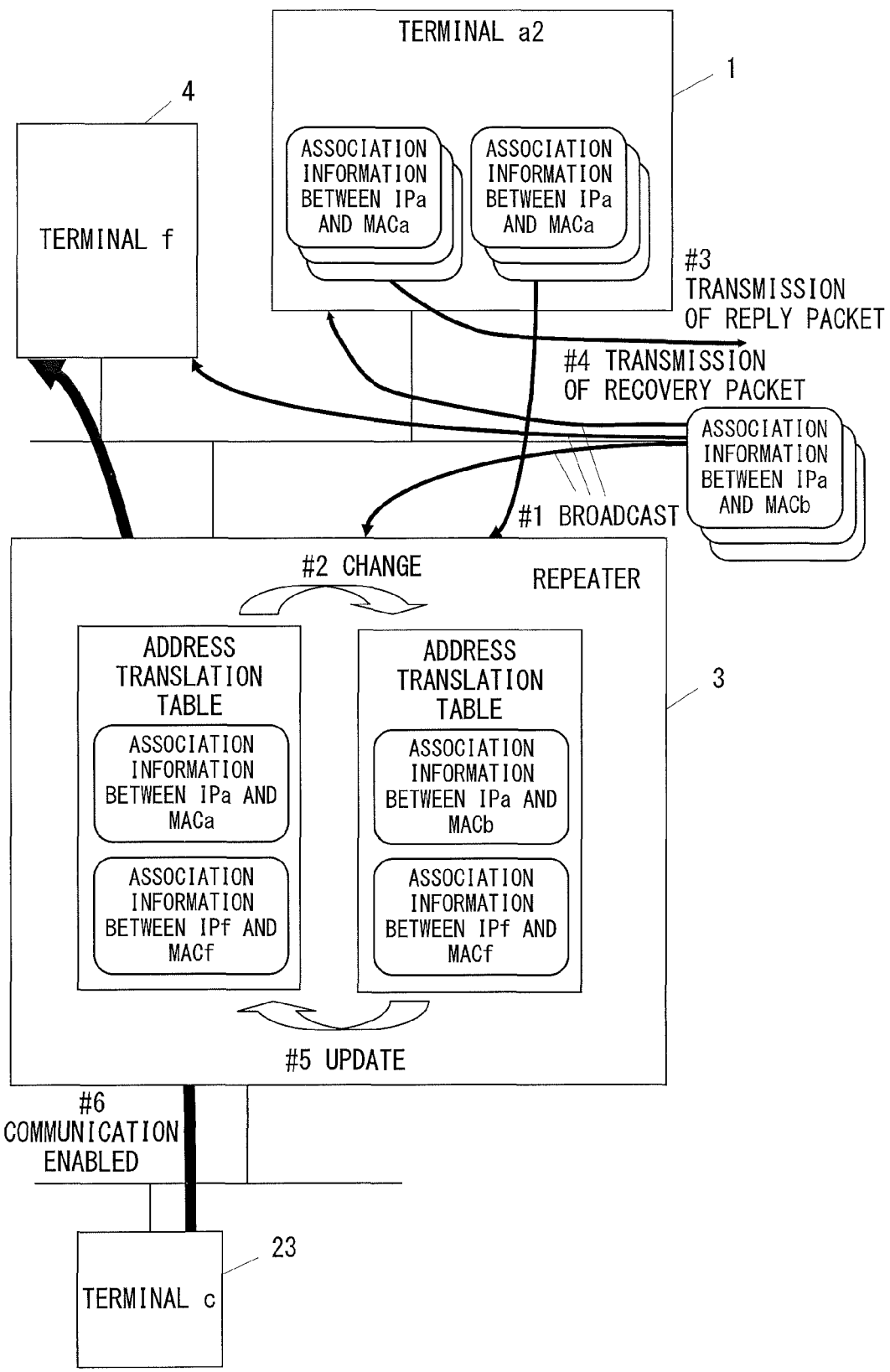
FIG. 9 is an explanatory view of a second application example of the communication apparatus according to the embodiment.

FIG. 9 is an explanatory view of a second application example of the communication apparatus according to this embodiment. The second application example in FIG. 9 is described by taking, as an example, a case where the association information between IPa and MACb is broadcast via the network by a plurality of times. The IP addresses and the MAC addresses, which are respectively logical addresses and physical addresses of the terminal f and the terminal 1 (terminal a2), are IPf and MACf, and IPa and MACa, respectively. Assume that the association information between IPa and MACa, and association information between IPf and MACf are initially stored in the address translation table within the repeater 3. When the association information between IPa and MACb is broadcast (#1 of FIG. 9) similarly to the description provided with reference to FIG. 8, the repeater 3 to which the association information has been broadcast changes the association information between IPa and MACa in the address translation table to the association information between IPa and MACb (see #2 of FIG. 9). Moreover, the terminal 1 to which the association information has been broadcast determines that IPa is duplicate for the physical address MACa of the local terminal and the broadcast MACb, and transmits a reply packet to MACb (see #3 of FIG. 9). Then, the terminal 1 transmits a recovery packet including the association information between IPa and MACa to the repeater 3 (see #4 of FIG. 9), and the repeater 3 changes the association information between IPa and MACb within the address translation table to the association information between IPa and MACa, which is included in the recovery packet (see #5 of FIG. 9).

Here, the repeater 3 changes the association information between IPa and MACa in the address translation table to the association information between IPa and MACb each time the association information between IPa and MACb is broadcast (see #2 of FIG. 9). Moreover, the terminal 1 transmits a recovery packet to the repeater 3 each time the association information between IPa and MACb is broadcast (see #4 of FIG. 9), and the repeater 3 changes the association information between IPa and MACb within the address translation table to the association information between IPa and MACa, which is included in the recovery packet (see #5 of FIG. 9). Namely, each time the association information between IPa and MACb is broadcast, the repeater 3 repeats the above described processes in #2 and #5. Accordingly, when the association information between IPa and MACb is frequently broadcast, a load imposed on the repeater 3 increases. As a result, for example, if a packet is transmitted from the terminal c to IPf (the terminal f) via the repeater 3, this packet is not transferred to the terminal f due to the heavy load imposed on the repeater 3.

Accordingly, as described with reference to FIG. 1, the terminal 1 determines whether or not the number of transmissions of a recovery packet per unit time exceeds the predetermined threshold value. If determining that the number of transmissions exceeds the predetermined threshold value, the transmission of the recovery packet is stopped as illustrated in #4 of FIG. 9. The transmission of the recovery packet is stopped, whereby the repeater 3 stops the process for changing the association information in the address translation table. As a result, an overload can be prevented from being imposed on the repeater 3.

Namely, with the second application example of the communication apparatus according to this embodiment described with reference to FIG. 9, an overload can be prevented from being imposed on the repeater 3 by stopping the transmission of a recovery packet when unintentional association information between an IP address and a MAC address is frequently broadcast. As a result, the repeater 3 is enabled to transfer, to the terminal f, a packet transmitted from the terminal c to IPf (see #6 of FIG. 9).

Figure 10:
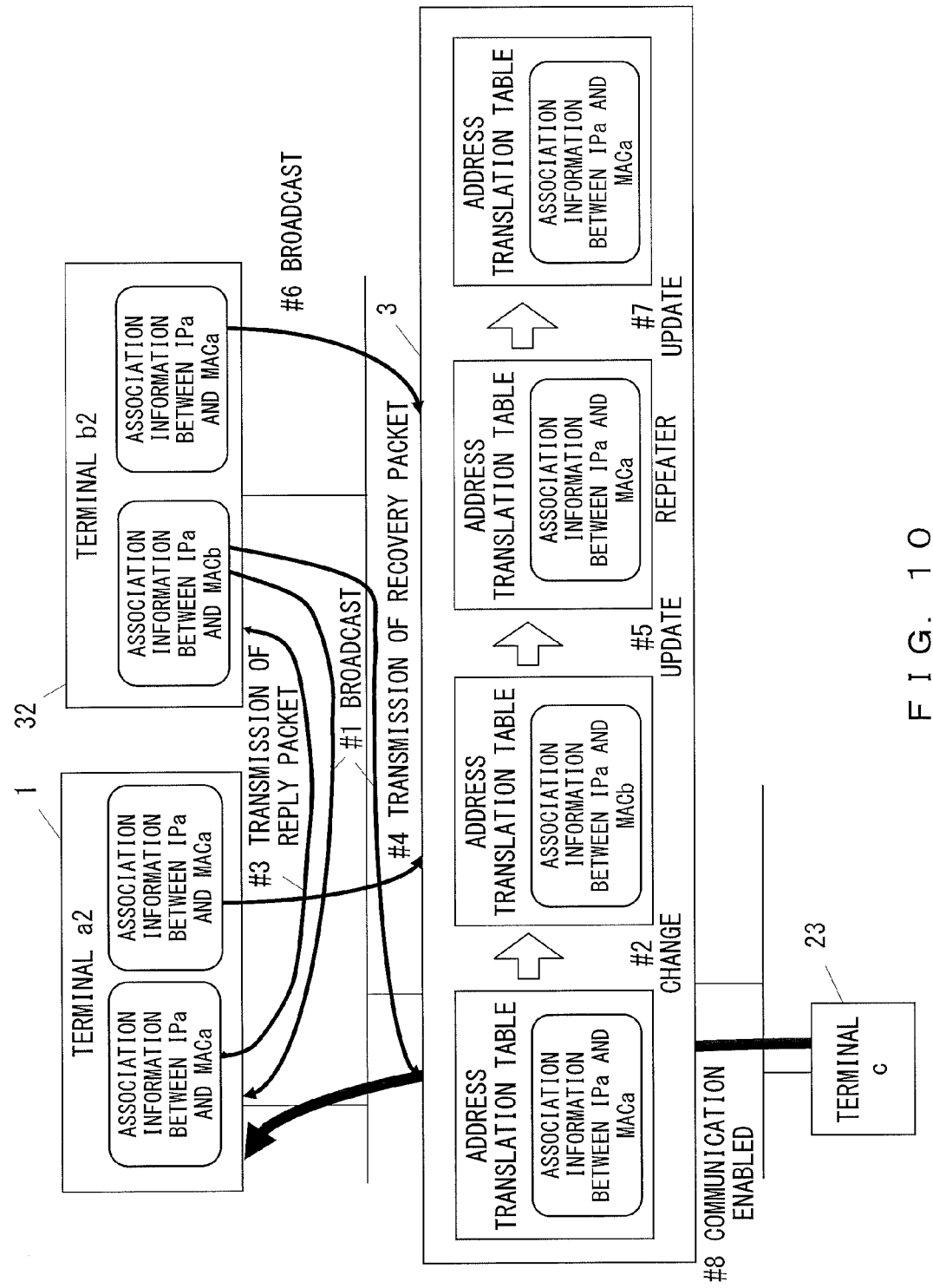
FIG. 10 is an explanatory view of a third application example of the communication apparatus according to the embodiment.

FIG. 10 is an explanatory view of a third application example of the communication apparatus according to this embodiment. In this example, a network system including the terminal 1 that is the communication apparatus according to this embodiment is configured by including the terminal b2 described above with reference to FIG. 13. Note that the physical address of the terminal b2 is MACb.

After setting IPa for the terminal b2 due to a fault, a trouble or an erroneous setting, the terminal b2 broadcasts the association information between IPa and MACb (see #1 of FIG. 10). Then, the repeater 3 to which the association information has been broadcast changes the association information between IPa and MACa in the address translation table to the association information between IPa and MACb (see #2 of FIG. 10). Moreover, the terminal 1 to which the association information has been broadcast determines that IPa is duplicate for the physical address MACa of the local terminal and the broadcast MACb, and transmits a reply packet including the association information between IPa and MACa to MACb, namely, the terminal b2 (see #3 of FIG. 10). Then, the terminal 1 transmits a recovery packet including the association information between IPa and MACa to the repeater 3 (see #4 of FIG. 10), and the repeater 3 updates the association information between IPa and MACb in the address translation table with the association information between IPa and MACa, which is included in the recovery packet (see #5 of FIG. 10). Then, the terminal b2 that has received the reply packet from the terminal 1 broadcasts the association information between IPa and MACa, which is included in the reply packet (see #6 of FIG. 10). Then, the repeater 3 to which the association information has been broadcast updates the association information between the IP address and the MAC address in the address translation table based on the association information between IPa and MACa (see #7 of FIG. 10). Note that, however, the association information between the IP address and the MAC address, which is included in the recovery packet broadcast from the terminal 1 to the repeater 3 in #3 of FIG. 10, is information including the same contents as those of the association information between the IP address and the MAC address, which is broadcast from the terminal b2 in #6 of FIG. 10. Accordingly, in #7 of FIG. 10, the repeater 3 updates the association information between the IP address and the MAC address in the address translation table to the association information including the same contents as those of the association information between the IP address and the MAC address, which is already stored in the address translation table. With the third application example of the communication apparatus according to the embodiment described with reference to FIG. 10, the repeater 3 updates the address translation table based on the correct association information between the IP address and the MAC address, which is transmitted from the terminal 1 and the terminal b2. Accordingly, the repeater 3 can securely update the address translation table to correct contents. As a result, the terminal c is enabled to securely communicate with the terminal 1 via the repeater 3 (see #8 of FIG. 10).

With the communication apparatus, the communication apparatus controlling method and the network system according to the embodiment, unintentional logical address duplication caused by a fault, a trouble or an erroneous setting of a device such as a repeater belonging to a network can be resolved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A communication apparatus connected to a network, comprising:
   a storing unit that stores association information between a physical address and a logical address of the communication apparatus as first association information;
   an obtaining unit that obtains association information indicating association between a physical address and a logical address transmitted to the communication apparatus via the network as second association information;
   a determining unit that determines whether the logical address included in the first association information and the logical address included in the second association information are duplicate based on the first association information and the second association information; and
   a notifying unit that notifies a device belonging to the network to which the communication apparatus belongs, of the first association information when the determining unit determines the logical address included in the first association information and the logical address included in the second association information are duplicate, and instructs the device to resolve duplication of the logical address, wherein
   the notifying unit notifies the device via an other communication apparatus having a physical address included in the second association information of the first association information, and instructs the device notified from the other communication apparatus of the first association information to resolve the duplication of the logical address.

2. The communication apparatus according to claim 1, further comprising
   a notification number storing unit that stores a number of notifications of the first association information to the device by the notifying unit, wherein the determining unit determines whether the number of notifications stored in the notification number storing unit exceeds a predetermined threshold value in a predetermined duration, and instructs the notifying unit to stop notifying the device when the number of notifications is determined to exceed the predetermined threshold value in the predetermined duration.

3. The communication apparatus according to claim 1, wherein
the obtaining unit obtains the second association information via a repeater in the network,
the notifying unit notifies repeater that resolves the duplication of the logical address of the first notification information.

4. A controlling method for a communication apparatus connected to a network and stores association information between a physical address and a logical address of the communication apparatus as first association information, the controlling method comprising:
obtaining association information indicating association between a physical address and a logical address transmitted to the communication apparatus via the network as second association information;
determining whether the logical address included in the first association information and the logical address included in the second association information are duplicate based on the first association information and the second association information; and
notifying a device belonging to the network to which the communication apparatus belongs of the first association information when the determining determines the logical address included in the first association information and the logical address included in the second association information are duplicate, and instructs the device to resolve duplication of the logical address included in the first association information and the logical address included in the second association information, wherein
when notifying the device of the first association information, the notifying notifies the device via an other communication apparatus having a physical address included in the second association information of the first association information, and instructs the device notified from the other communication apparatus of the first association information to resolve the duplication of the logical address.

5. The controlling method according to claim 4, wherein
the determining determines whether the number of notifications stored in a notification number storing unit that stores a number of notifications of the first association information to the device by the notifying exceeds a predetermined threshold value in a predetermined duration, and instructs the notifying unit to stop notifying the device when the number of notifications is determined to exceed the predetermined threshold value in the predetermined duration.

6. The controlling method according to claim 4, wherein
the obtaining obtains the second association information via a repeater in the network, and
the notifying notifies a repeater that resolves the duplication of the logical address of the first notification information.

\* \* \* \* \*